United States Patent
Cook

(10) Patent No.: US 10,089,691 B2
(45) Date of Patent: Oct. 2, 2018

(54) SYSTEMS AND METHODS FOR DETECTING POTENTIALLY INACCURATE INSURANCE CLAIMS

(71) Applicant: STATE FARM MUTUAL AUTOMOBILE INSURANCE COMPANY, Bloomington, IL (US)

(72) Inventor: Michael K. Cook, Carlock, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 411 days.

(21) Appl. No.: 14/096,884

(22) Filed: Dec. 4, 2013

(65) Prior Publication Data

US 2015/0154712 A1    Jun. 4, 2015

(51) Int. Cl.
*G06Q 40/00* (2012.01)
*G06Q 40/08* (2012.01)

(52) U.S. Cl.
CPC .................. *G06Q 40/08* (2013.01)

(58) Field of Classification Search
CPC ................................................... G06Q 40/08
USPC ............................................................ 705/4
See application file for complete search history.

(56) References Cited

U.S. PATENT DOCUMENTS

| | | | |
|---|---|---|---|
| 5,950,169 A * | 9/1999 | Borghesi et al. | 705/4 |
| 6,735,571 B2 * | 5/2004 | Coleman et al. | 705/7.34 |
| 8,447,627 B1 * | 5/2013 | Cruise | 705/2 |
| 8,860,864 B2 * | 10/2014 | Shiohara | 348/333.01 |
| 2002/0013717 A1 * | 1/2002 | Ando et al. | 705/4 |
| 2002/0188479 A1 * | 12/2002 | Renwick | G06Q 40/08 705/4 |
| 2003/0004748 A1 * | 1/2003 | Coleman | G06Q 10/105 705/7.34 |
| 2006/0173957 A1 * | 8/2006 | Robinson et al. | 709/204 |
| 2007/0233525 A1 * | 10/2007 | Boyle | 705/4 |
| 2007/0271272 A1 * | 11/2007 | McGuire et al. | 707/9 |

(Continued)

OTHER PUBLICATIONS

Ghosh, Shubharoop. Insurance claims settlement: a look at new advances in remote sensing and damage assessment technologies. ecityrisk. First Regional Europa Re Insurance Conference. Oct. 12-14, 2011. http://www.europa-re.eberlesystems.ch/file/pdf/03_europare2011v8.pdf.*

(Continued)

*Primary Examiner* — Stephanie Ziegle
(74) *Attorney, Agent, or Firm* — Marshall, Gerstein & Borun LLP; Randall G. Rueth

(57) ABSTRACT

Methods and systems for detecting inaccurate insurance claims associated with a loss event are provided. An insurance provider may receive loss event data associated with the loss event from a variety of sources. The insurance provider may also receive an insurance claim submission from the claimant customer that indicates an insured property and a claimed amount of damage to the insured property. The insurance provider examines the loss event data to estimate an actual amount of damage experienced by the property as a result of the loss event, and compares the actual amount of damage to the claimed amount of damage. Based on the comparison, the insurance provider may approve the insurance claim, deny the insurance claim, or flag the insurance claim. The systems and methods thus aim to reduce fraudulent or otherwise inaccurate insurance claim filings.

6 Claims, 6 Drawing Sheets

(56) References Cited

U.S. PATENT DOCUMENTS

| | | | |
|---|---|---|---|
| 2008/0077451 A1* | 3/2008 | Anthony | G06Q 40/08 705/4 |
| 2008/0154651 A1* | 6/2008 | Kenefick et al. | 705/4 |
| 2008/0255877 A1* | 10/2008 | Fernandez | 705/2 |
| 2009/0083078 A1* | 3/2009 | Landstrom et al. | 705/4 |
| 2009/0204448 A1* | 8/2009 | Kaehler et al. | 705/4 |
| 2009/0265193 A1* | 10/2009 | Collins et al. | 705/4 |
| 2009/0279734 A1* | 11/2009 | Brown | 382/100 |
| 2010/0030586 A1* | 2/2010 | Taylor et al. | 705/4 |
| 2010/0119053 A1* | 5/2010 | Goeldi | 379/265.09 |
| 2010/0241465 A1* | 9/2010 | Amigo et al. | 705/4 |
| 2011/0161116 A1* | 6/2011 | Peak et al. | 705/4 |
| 2011/0161118 A1* | 6/2011 | Borden et al. | 705/4 |
| 2011/0238408 A1* | 9/2011 | Larcheveque et al. | 704/9 |
| 2012/0116823 A1* | 5/2012 | Vasavada | G06Q 40/08 705/4 |
| 2012/0245963 A1* | 9/2012 | Peak et al. | 705/4 |
| 2012/0290330 A1* | 11/2012 | Coleman | G06Q 40/00 705/4 |
| 2013/0204876 A1* | 8/2013 | Szucs et al. | 707/738 |
| 2013/0218959 A1* | 8/2013 | Sa et al. | 709/204 |
| 2013/0339062 A1* | 12/2013 | Brewer et al. | 705/4 |
| 2014/0081998 A1* | 3/2014 | Fan et al. | 707/754 |
| 2014/0085328 A1* | 3/2014 | Codella | G06F 17/30 345/629 |
| 2014/0188910 A1* | 7/2014 | Miyasato et al. | 707/752 |
| 2014/0278769 A1* | 9/2014 | McCandless et al. | 705/7.31 |
| 2015/0032675 A1* | 1/2015 | Huehn et al. | 706/12 |

OTHER PUBLICATIONS

Phua et al.A Comprehensive Survey of Data Mining-based Fraud Detection Research. Sep. 30, 2010. http://www.europa-re.eberlesystems.ch/file/pdf/03_europare2011v8.pdf.*

IBM Webpage on Smarter Heathcare Solutions. Feb. 17, 2011. http://web.archive.org/web/20110217192403/http://www.ibm.com/smarterplanet/us/en/healthcare_solutions/nextsteps/solution/N259176O86551O95.html.*

* cited by examiner

SYSTEMS AND METHODS FOR DETECTING POTENTIALLY INACCURATE INSURANCE CLAIMS

FIELD OF THE DISCLOSURE

The present disclosure generally relates to systems and methods for processing insurance claims and, more particularly, to platforms and techniques for comparing real-time data to insurance claim data to detect potentially inaccurate insurance claims.

BACKGROUND

Customers purchase casualty insurance policies to insulate themselves from various risks posed to their property. For example, a homeowner may purchase a fire insurance policy or a driver may purchase an automobile insurance policy. Various "loss events" can result in damage to this property which can lead to customers filing insurance claims for the damage to collect any monies owed according to the casualty insurance policy. For example, loss events can result from hurricanes, earthquakes, severe storms, tornadoes, hailstorms, wildfires, and other causes.

However, claimant customers will occasionally file insurance claims that claim an inaccurate amount of damage. This may be due to an oversight or error on the part of the claimant customer or, in some cases, this may be due to a fraudulent filing. Some agencies or entities estimate the cost of fraudulent claims to cost billions of dollars annually. Additionally, fraudulent activities may even affect the lives of innocent people due to accidental or purposeful injury or damage. Moreover, the money lost through fraudulent claims is passed down to customers as a result of higher insurance premiums.

The existing techniques for investigating or determining fraudulent or erroneous claims are costly and time consuming. Accordingly, there is an opportunity for systems and methods to more effectively and efficiently determine when insurance claims are inaccurate as a result of errors or fraudulent activity.

SUMMARY

In an embodiment, a computer-implemented method of detecting inaccurate insurance claims associated with a loss event is provided. The method includes receiving loss event data related to the loss event, the loss event data indicating a property, and receiving an insurance claim from a claimant customer, the insurance claim associated with an insurance policy for the property and the insurance claim indicating a claimed amount of damage to the property. Further, the method includes examining the loss event data to estimate or calculate an actual amount of damage to the property and comparing the claimed amount of damage to the actual amount of damage. Based on the comparison, the method determines whether the claimed amount of damage is accurate.

In another embodiment, a computer-implemented method of identifying an inaccurate insurance claim for a property is provided. The method includes receiving at least one of third-party data and first-party data from at least one external component, and receiving an insurance claim from a claimant customer, the insurance claim associated with an insurance policy for the property and the insurance claim indicating a claimed amount of damage to the property. The method further includes examining the at least one of the third-party data and the first-party data to identify the property, and estimate an actual amount of damage to the property. Additionally, the method includes comparing the claimed amount of damage to the property to the actual amount of damage to the property to determine that the claimed amount of damage is inaccurate.

In another embodiment, a system for detecting inaccurate insurance claims associated with a loss event is provided. The system includes a communication module adapted to receive loss event data related to the loss event, the loss event data indicating a property, a claim processing module adapted to receive an insurance claim from a claimant customer, the insurance claim associated with an insurance policy for the property, and a memory adapted to store non-transitory computer executable instructions. The system further includes a processor adapted to interface with the communication module and the claim processing module, wherein the processor is configured to execute the non-transitory computer executable instructions to cause the processor to examine the insurance claim to identify a claimed amount of damage to the property and identify at least a portion of the loss event data that indicates the property. The processor is further configured to execute the non-transitory computer executable instructions to cause the processor to examine at least the portion of the loss event data to estimate or calculate an actual amount of damage to the property, compare the claimed amount of damage to the actual amount of damage and, based on the comparison, determine whether the claimed amount of damage is accurate.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
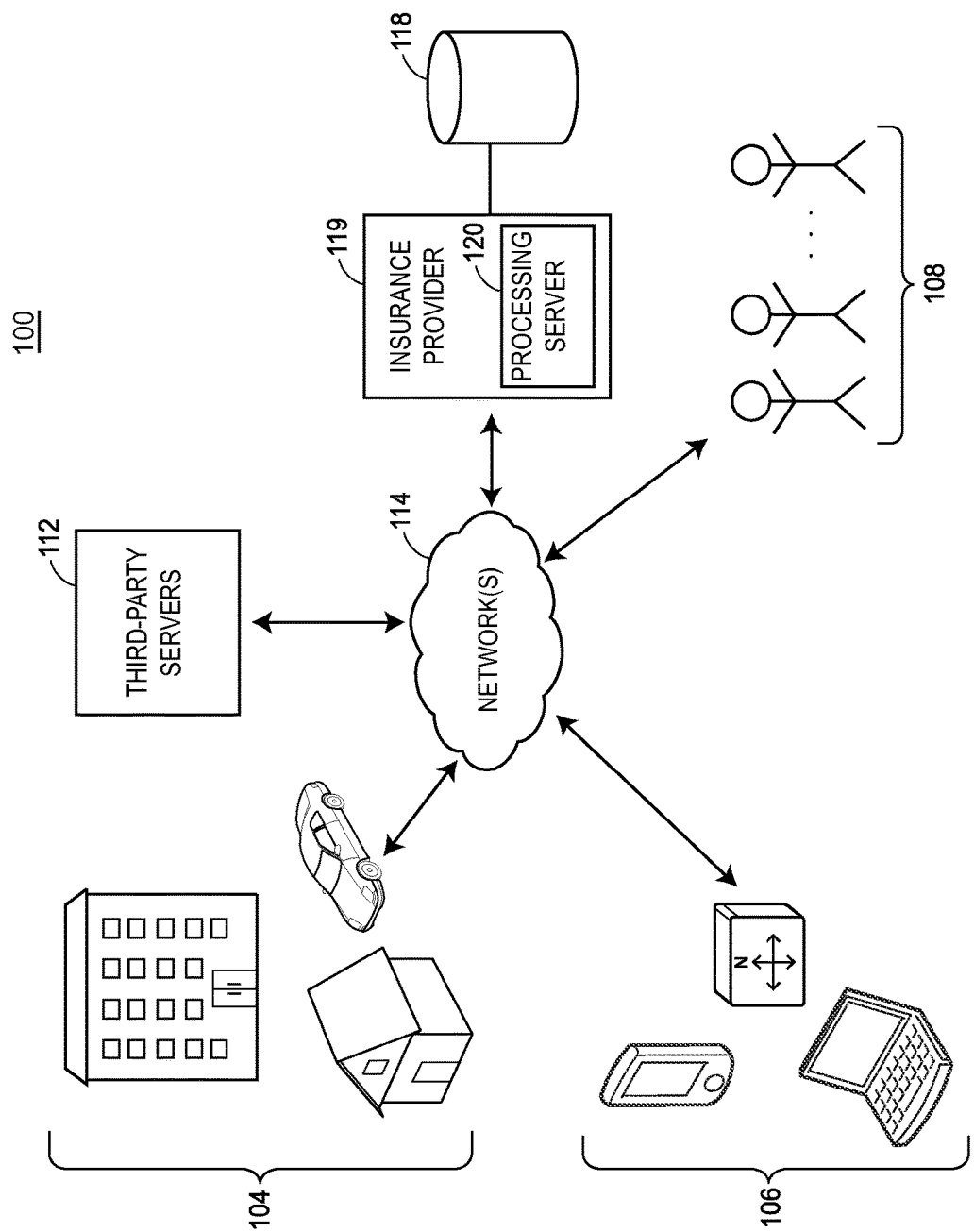
FIG. 1 depicts an example environment including components and entities associated with detecting insurance claim inaccuracies in accordance with some embodiments.

The novel systems and methods disclosed herein relate generally to detecting inaccurate insurance claims associated with insurance policies on properties. According to embodiments, the properties may experience damage resulting from loss events such as storms. Data relating to the loss events that indicates the damage may be reported to an insurance provider in a variety of ways. In particular, sensors associated with the property may collect and transmit the loss event data to the insurance provider. Further, policy holders and other users may input data related to the loss events via mobile devices and other channels. Additionally, third-party entities such as news, government, and weather agencies may transmit information to the insurance provider.

Responsive to the loss event, a policy holder may file an insurance claim for a property that indicates an amount of damage to the property and accordingly an amount that the policy holder believes he or she is owed. The insurance provider analyzes the loss event data to calculate or otherwise estimate an amount of damage that the property actually experienced. Further, the insurance provider compares this estimated amount of damage to the claimed amount of damage to determine whether the insurance claim is accurate or inaccurate, as well as whether any inaccuracy is from a mistake or due to a fraudulent claim. Depending on the result of the comparison, the insurance provider may approve the insurance claim, deny the insurance claim, or flag the insurance claim for further follow-up with the policy holder.

The systems and methods therefore enable effective and efficient detection of inaccurate claim filings. Because the insurance provider may automatically ingest loss event data and compare the loss event data to data included in insurance claim filings, resources conventionally used to investigate insurance fraud may be reduced or eliminated. Further, the systems and methods employ techniques to more accurately detect inaccurate insurance claims as well as detect more instances of inaccurate insurance claims, thus reducing the amount of improper damage refunds that insurance providers pay. Of course, this cost savings to the insurance providers is ultimately passed down to the policy holders themselves.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, the term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

An insurance provider may offer or provide one or more different types of insurance policies. Types of insurance policies may include, for example, auto insurance; homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

Typically, a person or customer (or an agent of the person or customer) of an insurance provider fills out an application for an insurance policy. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

FIG. 1 depicts an example environment 100 associated with detecting insurance claim inaccuracies using received loss event data. Although FIG. 1 depicts certain entities and components, it should be appreciated that additional or alternate entities and components are envisioned.

As shown in FIG. 1, the environment 100 includes example properties 104 capable of being insured or having insurance policies associated therewith. For example, the insurance policies can be associated with property insurance (e.g., car insurance, homeowner's insurance, renter's insurance), health insurance, life insurance, flood insurance, casualty insurance, and/or the like. The properties 104 can connect (e.g., using various communication modules) to an insurance provider 119 via one or more networks 114 such as, for example, a wide area network (WAN), a local area network (LAN), a personal area network (PAN), or other networks. The network 114 can facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth). The insurance provider 119 can be any individual, group of individuals, company, corporation, or other type of entity that can issue insurance policies for customers, such as insurance policies associated with the properties 104. According to embodiments, the insurance provider 119 can include one or more processing server(s) 120 configured to facilitate the functionalities as discussed herein. Although FIG. 1 depicts the processing server 120 as a part of the insurance provider 119, it should be appreciated that the processing server 120 can be separate from (and connected to or accessible by) the insurance provider 119.

According to embodiments, various types of events can occur that may give rise to various types of insurance claims for the example properties 104 according to the associated insurance policies. In particular, the events (referenced herein as "loss events") that may give rise to a claim can be damage or loss to property (e.g., damage to a car, damage to a home, or other damages or losses), an injury, and/or the like. For example, loss events can result from wind storms, hail storms, thunderstorms, floods, hurricanes, tornadoes, tsunamis, earthquakes, blizzards, wildfires, cyclones, volcanic eruptions, avalanches, and/or the like. Once the damage or loss resulting from the loss event has occurred, the various components of the environment 100 can initiate insurance processing associated with that damage or loss. Alternatively or additionally, the various components of the environment 100 can initiate insurance processing before the loss event has occurred (e.g., if the loss event is forecasted), during the loss event, or after the loss event has occurred but before any damage is assessed or known.

Although not depicted in FIG. 1, the example properties 104 can be equipped with one or more sensors capable of recording data related to one or more loss events. For example, a sensor in an automobile may record damage to the hood and windshield during a hailstorm and may transmit data about the damage to the processing server 120, for example using telematics techniques. Additionally or alternatively, a sensor in the roof of a house may record damage during a hailstorm and may transmit data about the damage to the processing server 120 over a high-speed Internet connection. In some embodiments, the sensors can be associated with an identification of a property and can be configured to identify a location of the property. It should be appreciated that the sensors may be coupled to or part of any of a vehicle, a building, a house, or any other property (e.g., an RFID tag on a pallet of electronics in a warehouse), according to various techniques and conventions. It should further be appreciated that the sensors (and/or communication modules) associated with the properties 104 can transmit or provide the data to the processing server 120 according to other techniques or communication channels.

Of course, it will be understood that other data collecting and reporting devices may be used to gather data about a loss event. For example, as shown in FIG. 1, a set of devices 106 (e.g., cellular phone, smartphone, GPS navigation system, a tablet computer, a notebook or desktop computer) can be configured to detect and/or receive data related to a loss event or potential loss event, and transmit the data to the processing server 120 via the network 114. In some cases, a potential claimant (e.g., an individual having an insurance policy for one of the example properties 104 or another property) may use one of the set of devices 106 to transmit data about the loss event to the processing server 120 (e.g., by reporting data about the loss via a telephone call, by entering data about the loss into a webpage or application, by filling out a paper form and submitting via fax or physical mail, or by other techniques). In other cases, an insurance administrator or other individual associated with an insurance provider may access the device 106 to input loss event data and initiate a transfer of the loss event data to the processing server 120. As understood herein, the data submitted via the set of devices 106 may be separate from formal insurance claim submissions. Instead, the data submitted via the set of devices 106 may be supplemental to data included in formal insurance claim submissions. As further understood herein, such sensor, claimant, and/or individual reported data about the loss event from the example properties 104 and the set of devices 106 may be collectively referred to as "first-party data."

According to embodiments, the first-party data generally relates to information about loss events such as the occurrence and/or extent of damage, the location of the loss, the time of the loss, the customer(s) to which the loss is pertinent, the cause of the loss (e.g., an indication that a loss was caused by water, fire, physical impact, wind), and/or the like. The first-party data can also include metadata such as the type of sensor reporting the data (e.g., make, model, version number, serial number), which software version the sensor is using to execute its functions, a timestamp for each data entry, the location of the sensor when it collected the data, information about the owner/renter of the sensor (e.g., name, address, customer ID number), and/or the like. If the first-party data is submitted by a customer or company representative, the first-party data may also include metadata regarding when the loss data was reported, to whom the loss data was submitted, where the loss data was submitted, and/or the like.

As depicted in FIG. 1, the processing server 120 can also connect to one or more third-party servers 112. Although FIG. 1 depicts the third-party server(s) 112 being connected to the processing server 120 via the network 114, it should be appreciated that the third-party server(s) can be a part of the processing server 120. According to embodiments, the third-party server(s) 112 can include data from news sources (e.g., national news networks, regional news networks, newspapers, magazines, news websites), data from weather sources (e.g., the National Oceanic and Atmospheric Administration; other federal, state, or local governmental weather bureaus; commercial weather services; weather websites), data from governmental sources (e.g., the Department of the Interior, the Department of Homeland Security, other federal, state, and local governmental sources), data from social networks (e.g., Facebook®, Twitter®, Google+®, Instagram®), data from public databases, data from private databases (e.g., consultants, data miners, surveyors), or other sources. Herein, such data from the third-party server(s) may be collectively referred to as "third-party data," and can include loss event data relating to one or more loss events that have happened (e.g., a lightning strike), are happening (e.g., a flood), or may happen in the future (e.g., a forecasted hurricane). According to embodiments, the first-party data and/or third-party data may be received by the processing server 120 as an Advanced Message Queuing Protocol (AMQP) message. It should be appreciated by those skilled in the art that receiving the first- and third-party data as AMQP messages can enable the processing server 120 to receive the data asynchronously and in a standardized format. Accordingly, the sources providing the first- and third-party data may provide the data in the AMQP message format.

As illustrated in FIG. 1, a set of claimants 108 may also interface with the insurance provider 119. Each of the set of claimants 108 may correspond to a policyholder having one or more insurance policies for one or more of the properties 104. Although FIG. 1 depicts the set of claimants 108 as individuals, it should be appreciated that the set of claimants 108 can include groups of individuals, companies, corporations, or any other entity capable of having a property insurance policy. As generally understood, the set of claimants 108 can submit, to the insurance provider 119, insurance claims for property damage to a property 104 specified in a corresponding insurance policy. The insurance claims can identify the corresponding claimant 108 and the insured property, and can include various data such as a description of the damage to the property, any images of the damage, a cost estimate for repairing the damage or replacing the property itself, and/or other data. The set of claimants 108 can submit insurance claims to the insurance provider 119 via a telephone call, by entering data about the loss into a webpage or application, by filling out a paper form and submitting via fax or physical mail, or by other techniques known in the art. In some cases, a claimant 108 may visit an insurance provider office and a representative may input the insurance claim information relayed by the claimant 108. Further, the set of claimants 108 may use the set of devices 106 to submit the insurance claims. As understood herein, the insurance claims submitted by the set of claimants 108 may be separate from the first-party data submitted via the set of devices 106 as discussed above.

As illustrated in FIG. 1, the processing server 120 can be configured to store or otherwise interface with a historical datastore 118 that stores data related to previously-occurred loss events and data associated therewith. For example, the historical datastore 118 can store data associated with a past hailstorm, such as insurance claims filed as a result of the hailstorm, the average amount of damage claimed in the insurance claims, and/or other data. It should be appreciated that the loss event data stored in the historical datastore 118 can correspond to actual events (e.g., a specific hurricane) or to general loss events (e.g., a "category 3" tornado).

While most insurance claims include accurate information regarding property damage and numbers related thereto, occasionally a policyholder may submit an insurance claim for damage that either does not exist or is exaggerated from the actual amount of damage. In some cases, an erroneous insurance claim may be the result of a genuine error or mistake (e.g., a typo on an online form). In other cases, the erroneous insurance claim may be the result of fraud. As discussed herein, approving and processing insurance claims having inaccurate information results in unnecessary costs for both the insurance provider 119 and its claimant customers 108 or policy holders.

According to embodiments, the processing server 120 can compare any received first-party data and third-party data, and optionally any relevant data from the historical datastore 118, to the submitted insurance claim data to detect inaccuracies and therefore reduce the number of inaccurate or fraudulent claims. In particular, the processing server 120 can perform the comparison to determine any discrepancies or inconsistencies between damage data indicated in the first-party data and the third-party data to damage amounts specified in the submitted insurance claims. In some embodiments, the processing server 120 can analyze the received first-party data and/or third-party data to calculate or estimate an actual amount of damage of the associated property. For example, if windshield sensor data for a vehicle indicates a broken windshield, the processing server 120 can calculate an amount for a replacement windshield for the vehicle. For further example, the processing server 120 can analyze third-party weather data indicating a severe hurricane passing through a particular city, and can estimate actual amounts of damage to the properties (e.g., homes) of claimant customers who reside in that particular city. In this example, the processing server 120 may also leverage historical insurance claim data associated with a similar-sized hurricane and stored in the historical datastore 118 to gauge accuracy of the insurance claims.

The processing server 120 can compare any difference between the claimed amount of damage and the actual amount of damage to a threshold value or percentage to determine whether to approve, deny, or flag the insurance claims. As an example, assume that a hailstorm passes through a town in which a claimant customer 108 of the insurance provider 119 resides. Following the hailstorm, the claimant customer 108 submits an insurance claim for hail damage to a hood of a vehicle, whereby the insurance claim specifies a damage amount of $1,200. Further, the insurance provider 120 ingests sensor data from one or more sensors on the vehicle hood, whereby the sensor data indicates minimal damage to the vehicle hood. The insurance provider 120 can estimate, based on the sensor data, that the actual damage to the vehicle hood may be significantly less than the claimed damage amount. Accordingly, the insurance provider 120 can flag the insurance claim to be followed up by an insurance representative. In some cases, the insurance provider 120 can automatically deny the insurance claim based on the discrepancy between the claimed amount of damage and the estimated actual amount of damage. If, on the other hand, the claimed amount of damage is the same as or similar to the estimated actual amount of damage, the insurance provider 120 can approve the insurance claim. In further embodiments, if the claimed amount of damage is less than the estimated actual amount of damage by a certain degree, the insurance provider 120 can notify the claimant 108 of the discrepancy and inquire as to if there is more damage than what the claimant 108 is claiming.

Figure 2:
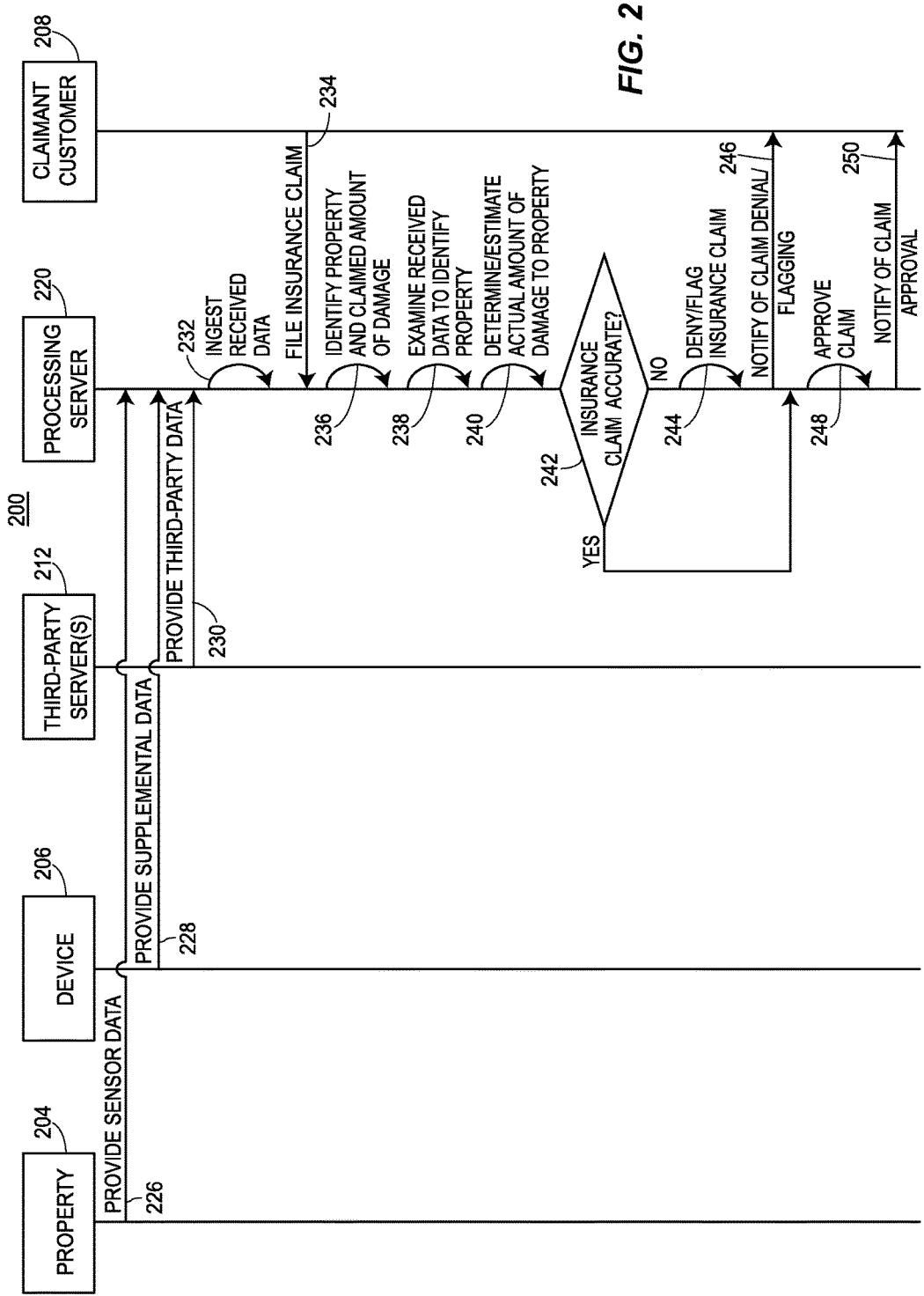
FIG. 2 depicts an example diagram associated with detecting insurance claim inaccuracies in accordance with some embodiments.

Referring to FIG. 2, depicted is a signal diagram 200 illustrating techniques for processing insurance claim data in combination with received and/or stored data to determine or detect inaccurate insurance claims. In particular, FIG. 2 includes a property 204 (such as one of the properties 104 as described with respect to FIG. 1), a device 206 (such as one of the devices 106 as discussed with respect to FIG. 1), a third-party server 212 (such as one of the third party server(s) 112 as discussed with respect to FIG. 1), a processing server(s) 220 (such as the processing server 120 as discussed with respect to FIG. 1), and a claimant customer 208 (such as one of the claimant customer(s) 108 as discussed with respect to FIG. 1).

Although not shown in FIG. 2, it should be appreciated that the processing of the diagram 200 may be triggered by or initiated before, during, or after the occurrence of a loss event. For example, there may be a tornado in a specific area that can constitute a loss event. The property 204 can provide (226) sensor data (or another type of loss event data) to the processing server(s) 220. For example, a wind gauge on a house can sense high winds and provide data associated with the high winds to the processing server(s) 220. In some cases, the device 206 can provide (228) supplemental data to the processing server(s) 220, such as if a user (e.g., the claimant customer 208, an insurance representative, or others) of the device 206 manually enters data about a specific loss event or about specific property damage. In further cases, the third-party server 212 can provide (230) third-party data to the processing server(s) 220. For example, the third-party server 212 can correspond to a social networking service and the third-party data can include social media data related to a blizzard.

Figure 4:
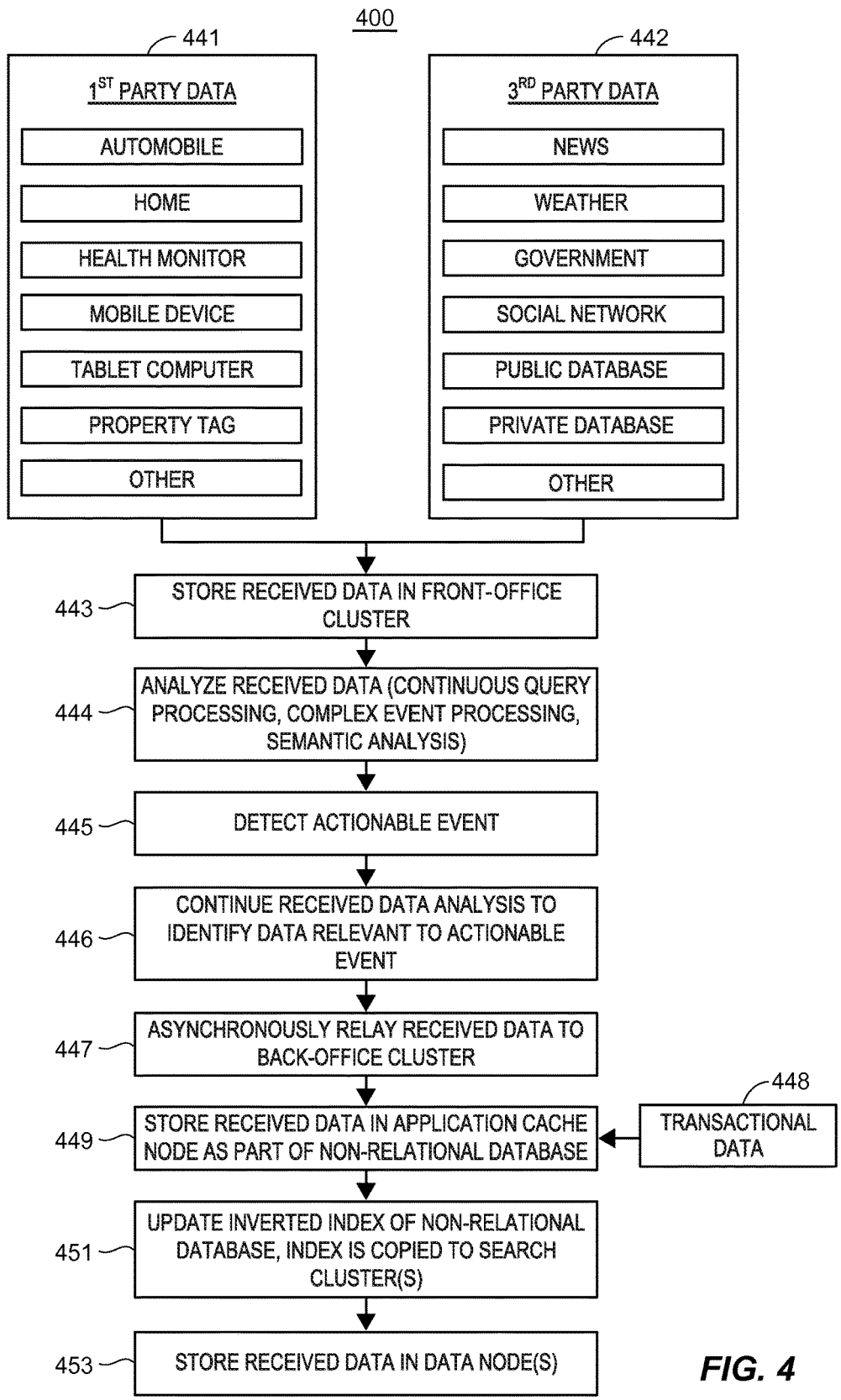
FIG. 4 depicts a flow diagram of processing information related to an actionable loss event in accordance with some embodiments.

After receiving the sensor data and/or the supplemental data (collectively the first-party data), and/or the third-party data, the processing server(s) 220 can ingest (232) the received data. In some embodiments, it may be advantageous for the processing server(s) 220 to store the ingested data in high-speed memory (e.g., RAM) and/or bulk storage (e.g., magnetic hard disk drive). FIG. 4 depicts more detailed processing associated with the processing server(s) 220 ingesting the received data. According to embodiments, the processing server(s) 220 can examine the received data to identify the occurrence of a loss event and details associated therewith. For example, the processing server(s) 220 can ingest and examine the received data to determine that a severe thunderstorm is occurring or is forecasted to occur.

The processing server(s) 220 may then perform functions to analyze insurance claims in combination with the first- and third-party data to determine inaccurate (or accurate) insurance claims, and/or insurance claims that require follow-up inquiries. In particular, the customer 208 can file (234) an insurance claim, for example via an online submission, via a telephone call, via submitting the claim in-person, via using the device 206, or via other channels. The processing server(s) 220 can identify (236) a property listed in the insurance claim as well as a claimed amount of damage to the property. For example, the insurance claim can identify damage to a roof of a house in the amount of $20,000. The processing server(s) 220 can examine (238) any combination of the received first-party and/or third-party data to identify the property that is indicated in the insurance claim. For example, the processing server(s) 220 can examine first-party sensor data to determine that sensors detected damage to the claimed property. For further example, the processing server(s) 220 can examine third-party weather data to identify a geographic area through which a severe storm passed and in which a house resides. Further, for example, the processing server(s) 220 can examine GPS navigation data from the device 206 to determine that a vehicle was in a vicinity of a tornado.

The processing server(s) 220 can determine or estimate (240) an actual amount of damage to the property from the received data. For example, the processing server(s) 220 can examine sensor damage to first calculate how much damage the sensor(s) sensed and then calculate the cost of the damage. For further example, if a tornado passes through a town, the processing server(s) 220 can estimate the amount of damage to a house based on the size of the house, the size of the tornado, whether the tornado touched down near the house, and/or other factors. For further example, using the same tornado event, the processing server(s) 220 can examine GPS data from a vehicle to determine the vehicle's position in relation to the vicinity of the tornado. In some cases, the processing server(s) 220 may leverage any historical data in combination with the received data to supplement the determination or estimation of the actual amount of damage. For example, the processing server(s) 220 may identify the average insurance claim payout for vehicle damage resulting from a hailstorm. It should be appreciated that other techniques for determining or estimating the actual amount of damage to the property are envisioned.

The processing server(s) 220 can determine (242) whether the insurance claim is accurate by determining any discrepancy between the claimed amount of damage and the calculated or estimated actual amount of damage. In some embodiments, the processing server(s) 220 can calculate the difference between the claimed amount of damage and the actual amount of damage, and compare this difference to a threshold amount or percentage. For example, if a claimed amount of damage to a boat is $100,000 and the actual (estimated) amount of damage to the boat as determined from the received data is $60,000, the processing server(s) 220 may deem the difference between the amounts ($40,000) to be enough to either flag or deny the insurance claim (e.g., if the threshold amount is $3,000). For further example, if the claimed amount of damage to a vehicle is $2,100 and the actual (estimated) amount of damage to the vehicle as determined from the received data is $2,000, the processing server(s) 220 may deem the insurance claim as accurate (e.g., if the threshold percentage is 10%). It should be appreciated that various threshold amounts or percentages are envisioned. For example, the threshold amount can be $100 and the threshold percentage can be 5%. Further, the various threshold amounts may increase (or decrease) as the claimed amounts of damage increase (or decrease).

If the processing server(s) 220 does not determine the insurance claim to be accurate ("NO"), the processing server(s) 220 can deny or flag (244) the insurance claim. If the processing server(s) 220 flags the insurance claim, the processing server(s) 220 can request an insurance representative to review the insurance claim and inquire about any of the content, for example by calling the claimant customer 208. The processing server(s) 220 can have various conditions or requirements for flagging or denying an insurance claim. For example, if the claimed amount of damage differs from the estimated or calculated amount of damage by a smaller degree, the processing server(s) 220 can flag the insurance claim; and if the claimed amount of damage differs from the estimated or calculated amount of damage by a larger degree, the processing server(s) 220 can deny the insurance claim. For example, the threshold for denying the insurance claim instead of flagging the insurance claim can be if the claimed amount of damage differs from the estimated amount of damage by at least 50%, or other percentages. In either case, the processing server(s) 220 can notify (246) the claimant 208 of the insurance claim denial or flagging. In some cases, the processing server(s) 220 can flag the insurance claim and notify the claimant 208 of the flagging before optionally denying the insurance claim. In further cases, the processing server(s) 220 can flag the insurance claim if the claimed amount of damage is less than the actual (estimated) amount of damage.

If the processing server(s) 220 determines the insurance claim to be accurate ("YES"), the processing server(s) 220 can approve (block 248) the insurance claim, for example by processing the insurance claim and paying out any monies owed to the claimant customer 208. Further, the processing server(s) 220 can notify (block 250) the claimant customer 208 of the insurance claim approval.

Figure 3:
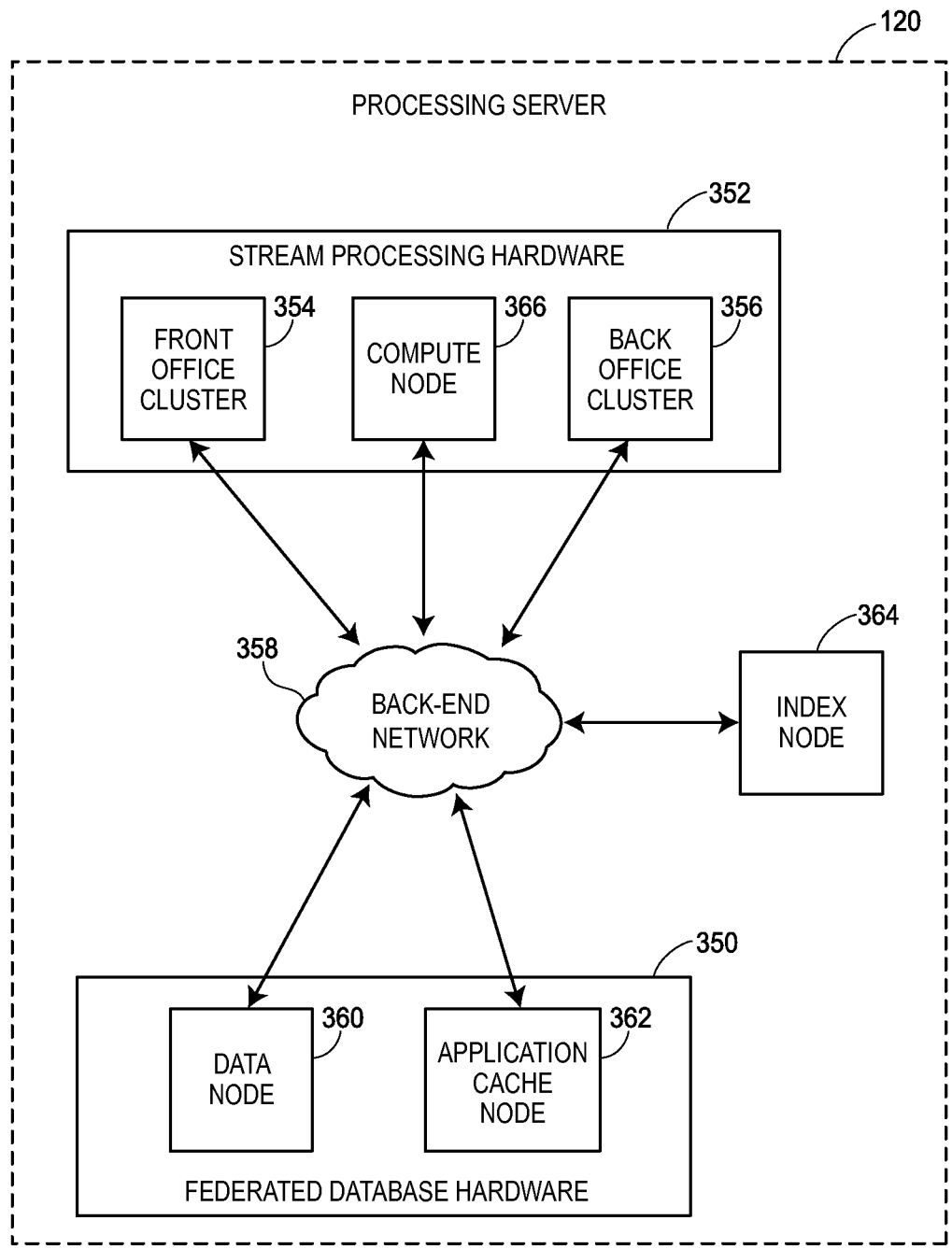
FIG. 3 is a block diagram of a processing server in accordance with some embodiments.

Referring to FIG. 3, depicted is a more detailed view of the processing server 120 and components thereof configured to ingest and store loss event data and any resulting data or information. Before processing or using any received data as discussed herein, the processing server 120 can process and store the received data in a non-relational database (e.g., one or more Log-Structure Merge Tree (LSM-Tree) Databases such as HBase stored using a Hadoop framework), a process referred to herein as "ingestion." The one or more non-relational databases may be stored in a federated database hardware 350. Generally speaking, the processing server 120 can receive two different kinds of data: transactional data and non-transactional data. Transactional data includes data and documents with direct monetary impact (e.g., insurance claims, insurance policies, financial transactions between the customer and insurance company, financial transactions between insurance companies, banking records). Non-transactional data refers to data that does not have a direct monetary impact (e.g., data gathered by sensors in the field, posts to social networks, news reports, weather reports). According to some embodiments, it may be advantageous for the processing server 120 to ingest transactional data and non-transactional data differently. In particular, it may be advantageous for the processing server 120 to ingest transactional data into the federated database hardware 350 and ingest non-transactional data using dedicated stream processing hardware 352 in order to process incoming heterogeneous data with varying latency requirements. As shown in FIG. 3, the stream processing hardware 352 can be connected to the federated database hardware 350 via a dedicated back-end network 358, which may be understood to be any type of data connection. According to embodiments, a compute node 366 can facilitate any processing (e.g., memory reads, memory writes) associated with the stream processing hardware 352.

Referring to FIG. 4, depicted is a block diagram of an example data reception and ingestion technique 400 implemented by the processing server 120 as depicted in FIG. 3. The processing sever 120 can receive first-party data (represented as block 441) and/or third-party data (represented as block 442). As discussed herein, the first-party data 441 can include data collected by sensors associated with properties (e.g., sensors in an automobile, house, property tag, mobile device) or data relayed to the processing server 120 by a customer or company representative via a device (e.g., via email, telephone call, fax, input via website, input via application). Further, as discussed herein, the third-party data 442 can include data or information from various sources such as those relating to news, weather, government, social networks, public databases, private databases, and others.

Referring to FIG. 4 in conjunction with FIG. 3, when a new portion of non-transactional data is received by the processing server 120 (e.g., as an AMQP message), the data is routed (block 443) to a front office cluster 354 of the stream processing hardware 352 for storage. Depending on the type of data, received data may be prioritized for immediate ingestion processing off the front office cluster 354 or sent to a back office cluster 356 for later ingestion. For example, transactional data such as with a first notice of loss may be ingested directly off the front office cluster 354 via a search-based application (SBA). In embodiments, non-transactional data and/or transactions from machine sources (e.g., telematics data) can be ingested through the stream processing hardware 352 and then to the federated database hardware 350, and specifically from the front office cluster 354 to the back office cluster 356 then to the federated database hardware 350.

According to embodiments, the front office cluster 354 may be used to address low latency ingesting and processing, primarily with RAM, and the back office cluster 356 may be used to address processing with less demanding latency, primarily with direct-attached storage (DAS) such as an array of hard disk drives. In some embodiments, it may be advantageous to initially receive all data at the front office cluster 354 and asynchronously copy data with less demanding latency to the back office cluster 356 continuously as new data is received (block 447). Of course, it will be appreciated that it may also be advantageous for data with particularly low latency to be processed off the front office cluster 354 without or prior to it being sent to the back office cluster 356. A given SBA can specify data ingestion routes (e.g., front office cluster 354 to back office cluster 356 to federated database hardware 350).

Because data is received continuously and it is advantageous to ensure that received data is made available for access as soon as possible, the ingestion of any received data from the front office cluster 354 may include routing the received data to a high-speed memory store. Because the processing and/or modification of the data discussed below may occur in real-time as the data is received or used, it is advantageous for the data processor(s) to be able to access data via high-speed memory. It may further be advantageous to load data into high-speed memory as it is needed (or anticipated to be needed) to minimize the amount of high-speed memory that is allocated at a certain period of time. Additionally, as the data is being processed, the underlying data may need to be changed or updated (e.g., correcting a typo in a name, updating an old mailing address). Thus, as the change is made to the data entry loaded into high-speed memory, the updated data entry is used for whatever processing is pending, and cached to allow the entry in bulk storage to be updated asynchronously when computing resources are available (i.e., write-behind).

It may be advantageous to perform complex event processing (CEP), continuous query processing, and/or semantic processing on the received data using either or both of the front office cluster 354 and the back office cluster 356 (block 444). In an example, the CEP, continuous query processing, and/or semantic processing may be performed by one or more front office clusters 354 on received data stored in the in-memory cache of the one or more front office clusters 354. In another example, the CEP, continuous query processing, and/or semantic processing may be performed by one or more back office clusters 356 on received data stored on a hard disk drive of the one or more back office clusters 356.

According to embodiments, the CEP results in the identification of an occurrence of an event based on business needs for a given search-based application (SBA) along with a corresponding action. The event and action mapping can be a many-to-many relationship, whereby one event may spawn multiple actions and many events may spawn an action. The front office cluster 354 and the back office cluster 356 may be used to relay events to actors using a "publish-subscribe" pattern to perform the CEP for a given SBA. In some embodiments, the CEP may be self-contained within a single process. It should be appreciated that actions may generate transaction or non-transaction data which can be routed for storage in the federated database hardware 350. Identified events that are specific to a given SBA that acted upon those events in producing transaction or non-transaction data are likely to be recorded alongside and in the form of data enrichment and audit. In some embodiments, all data recorded on the federated database hardware 350 may be indexed with an inverted index which permits information retrieval and/or search. Further, transactional and non-transactional data enriched with acted-upon event identifiers may be visible to search along with data stored in the federated database hardware 350.

Referring back to FIG. 4, and as discussed herein, the CEP may be used to identify an actionable event (block 445). After identifying an actionable event, the CEP may further be used to identify other pieces of data related or relevant to the actionable event (block 446). For example, the back-end network 358 may receive an official hailstorm alert from a governmental weather agency (e.g., the NOAA), which may be identified as an actionable event and may trigger the use of CEP techniques to identify data that may be associated with the storm alert (e.g., damage reports from sensors in automobiles/houses, social media posts about a hailstorm, local news coverage of a hailstorm, or other data). The CEP may include identifying characteristics about the triggering event such as location, affected population, and/or the like, and search for data and/or words and phrases relating to the triggering event that are substantially related to the identifying characteristics. In the hailstorm example discussed above, CEP may include identifying the county or counties included for which the hailstorm alert was issued and performing continuous query processing for data and/or words and phrases that correlate to hail damage. The CEP may further include the use of semantic processing tools and techniques to improve the identification of relevant data. For example, the back-end network 358 may use semantic classification software such as Apache® Stanbol. Such semantic processing may be useful to evaluate data by contextualizing search query hits. For example, semantic processing may be used to identify references in news coverage and social media posts to "hail" that are associated with the storm alert (e.g., a social media post consisting of a photograph of a large hailstone with a caption about the size of hailstones falling in the posting user's backyard) and exclude references that are not relevant (e.g., a social media posting by a user complaining about the difficulty of finding a taxi cab to hail).

Actionable events may be any of a number of events that have the potential to affect claims by a plurality of customers. In addition to weather alerts, actionable event triggers may include recall notices from an automobile manufacturer or automobile manufacturer supplier, an earthquake notification from the United States Geological Survey or other agency, a news report of a man-made disaster (e.g., a multiple-vehicle collision, a train derailment, a chemical spill), a report of a sudden swarm of insects, etc. Actionable events may be single occurrences (e.g., a hailstorm) or on-going events (e.g., a swarm of insects). When data that may be associated with an actionable event is identified, a record may be made (e.g., an entry in an index) that can store at least a portion of the data. Additionally, non-relevant data may be archived in bulk storage for recall at a later time. This record may be used in facilitating the insurance claim accuracy detection functionalities as discussed below in connection to FIG. 5.

After a datum has been subject to continuous query processing at least once (e.g., to determine whether the datum has information that should trigger an actionable event and/or analyze the datum to determine whether it is relevant to one or more actionable events), the datum may be asynchronously received at the back-office cluster 356 (block 447). After being received, the datum may be queued for indexing and inclusion in one or more non-relational databases stored in the back-end network 358 (e.g., a non-relational database stored in one or more application cache nodes 362 and/or one or more data nodes 360 of the federated database hardware 350). Additionally, the back-end network 358 may receive transactional data as discussed above, which may also be queued for indexing and inclusion in one or more non-relational databases stored in the back-end network 358 (block 448). When computing resources are available, then any queued data (transactional or non-transactional) may be stored as a data transfer object (DTO) in an In Memory Work In Progress (WIP) Data Store stored on one or more application cache nodes 362 as part of one or more non-relational databases (block 449).

It may be advantageous to index the received data as each datum is added to the one or more non-relational databases to make information retrieval more efficient (block 451). The received data may be indexed using one or more inverted indexes. In one embodiment, an inverted index may be an index data structure with mapping information indicating where content (e.g., words, numbers) is located in each datum. The inverted indexes may enable the one or more non-relational databases to be full text searchable. In an example, the back-end network 358 may use Apache® Lucene, an information retrieval software library, to generate the one or more inverted indexes. Additionally, it may be advantageous to have one or more components of the back-end network 358 dedicated to generating and storing the one or more indexes, such as in one or more index nodes 364. If one or more dedicated index nodes 364 are used, the index nodes 364 may communicate with the application cache nodes 362 in which the received data is stored to generate the one of more indexes and to store the indexes at the index nodes 364.

Once a datum is stored in the In-Memory WIP Data Store, it may be replicated in a non-relational database spanning the one or more data nodes 360 (block 453). As discussed below, there may be a plurality of the data nodes 360, and the datum may be replicated with a copy stored on multiple data nodes 360 for redundancy. Once a datum has been replicated onto the one or more data nodes 360, it may be advantageous to remove the datum from the In-Memory WIP Data Store. In particular, if the copy of the datum stored in the In-Memory WIP Data Store is not currently in use or predicted to be in use in the near future, the copy of the datum stored in the In-Memory WIP Data Store may be deleted and the space in memory de-allocated. It may be advantageous to structure the In-Memory WIP Data Store such that when memory is de-allocated, some of the hardware providing the In-Memory WIP Data Store may be turned off to conserve power and reduce heat in one or more data centers in which the back end components are situated.

Figure 5:
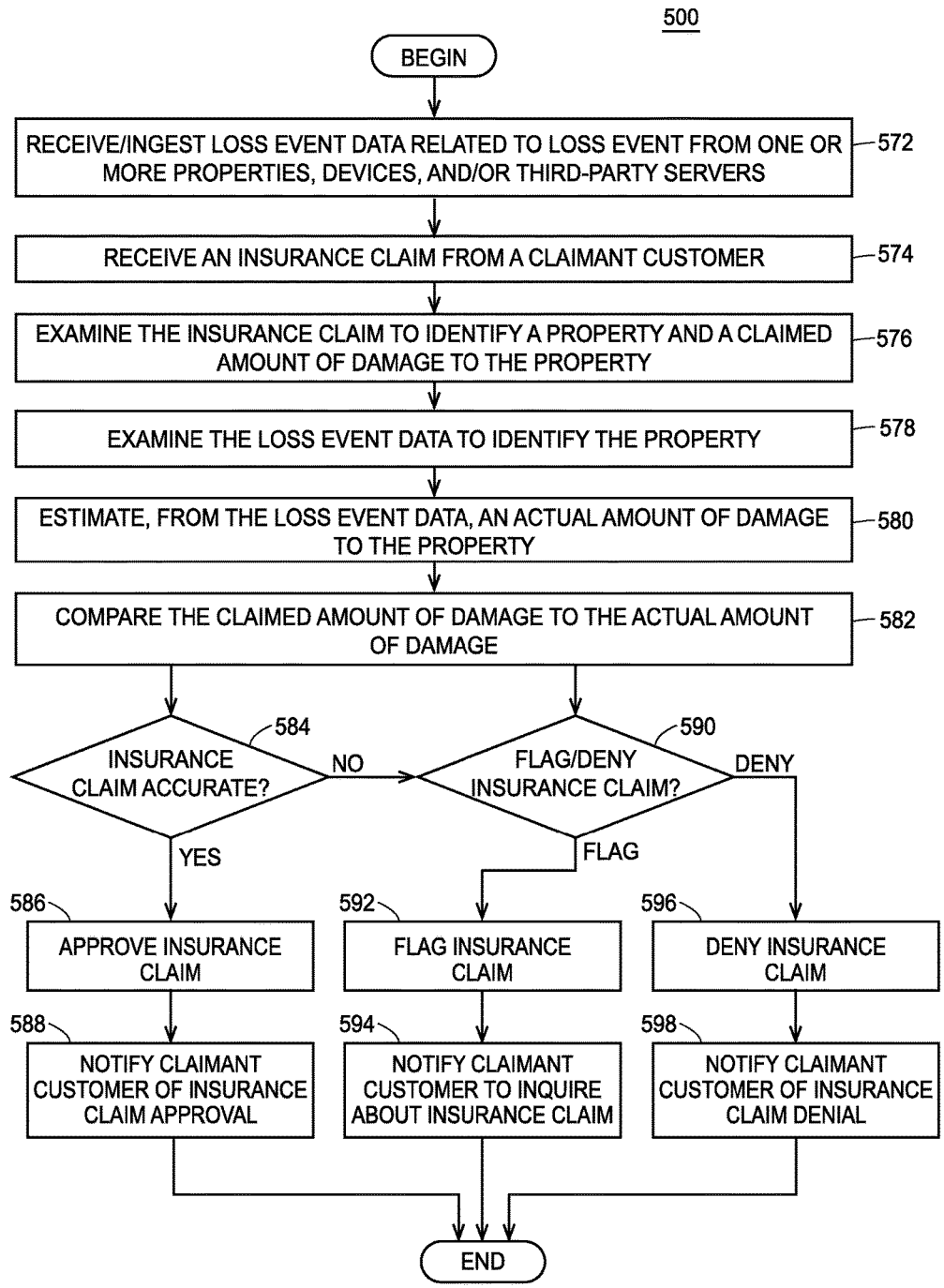
FIG. 5 depicts a flow diagram of determining inaccurate insurance claims in accordance with some embodiments.

Referring to FIG. 5, depicted is a block diagram of an example insurance claim processing technique 500 implemented by the processing server 120 as depicted in FIG. 1. The processing server can receive or ingest (block 572) loss event data related to a loss event from one or more properties, devices, and/or third-party servers according to the techniques as discussed herein. The processing server can also receive (block 574) an insurance claim from a claimant customer. The processing server may receive the insurance claim via various channels, such as an online submission, a telephone call, an in-person visit, or other channels.

The processing server can examine (block 576) the insurance claim to identify a property and a claimed amount of damage to the property. The processing server can also examine (block 578) the loss event data to identify the property within at least a portion of the loss event data. In particular, the processing server determines whether the loss event data includes data for the property that is indicated in the insurance claim filed by the claimant customer. The processing server can estimate (block 580), from the loss event data, an actual amount of damage to the property. For example, the processing server can analyze sensor data from a property sensor(s) to determine how much damage the property sensor(s) sensed. For further example, the processing server can cross-reference GPS data with third-party weather data to determine that a vehicle was in the path of a severe tornado, and can estimate the actual amount of data based on this information. It should be appreciated that other techniques for estimating the actual amount of damage are appreciated.

The processing server can compare (block 582) the claimed amount of damage to the actual amount of damage. In embodiments, the processing server can calculate the difference (actual difference or percentage difference) between the claimed amount of damage and the actual amount of damage. The processing server can determine (block 584) whether the insurance claim is accurate. In some embodiments, the processing server can determine whether the claimed amount of damage differs from the actual amount of damage by a threshold amount or percentage. If the claimed amount of damage does not differ from the actual amount of damage by the threshold amount or percentage (i.e., the insurance claim is accurate; "YES"), processing can proceed to block 586. At block 586, the processing server can approve the insurance claim. Further, the processing server can notify (block 588) the claimant customer of the insurance claim approval.

If the claimed amount of damage does differ from the actual amount of damage by the threshold amount or percentage (i.e., the insurance claim is not accurate; "NO"), processing can proceed to block 590. At block 590, the processing server can determine whether to flag or deny the insurance claim. According to embodiments, the processing server can determine whether to flag or deny the insurance claim based on the degree of difference between the claimed amount of damage and the actual amount of damage. If the processing server determines to flag the insurance claim ("FLAG"), processing can proceed to 592; of if the processing server determines to deny the insurance claim ("DENY"), processing can proceed to 596.

At block 592, the processing server can flag the insurance claim. Further, the processing server can notify (block 594) the claimant customer to inquire about the insurance claim. For example, a representative for the insurance provider may call the claimant customer to inquire about any discrepancy between the claimed amount of damage and the actual amount of damage. At block 596, the processing server can deny the insurance claim. Further, the processing server can notify (block 598) the claimant customer of the insurance claim denial. The processing server may optionally provide a reason for the insurance claim denial to the claimant customer.

Figure 6:
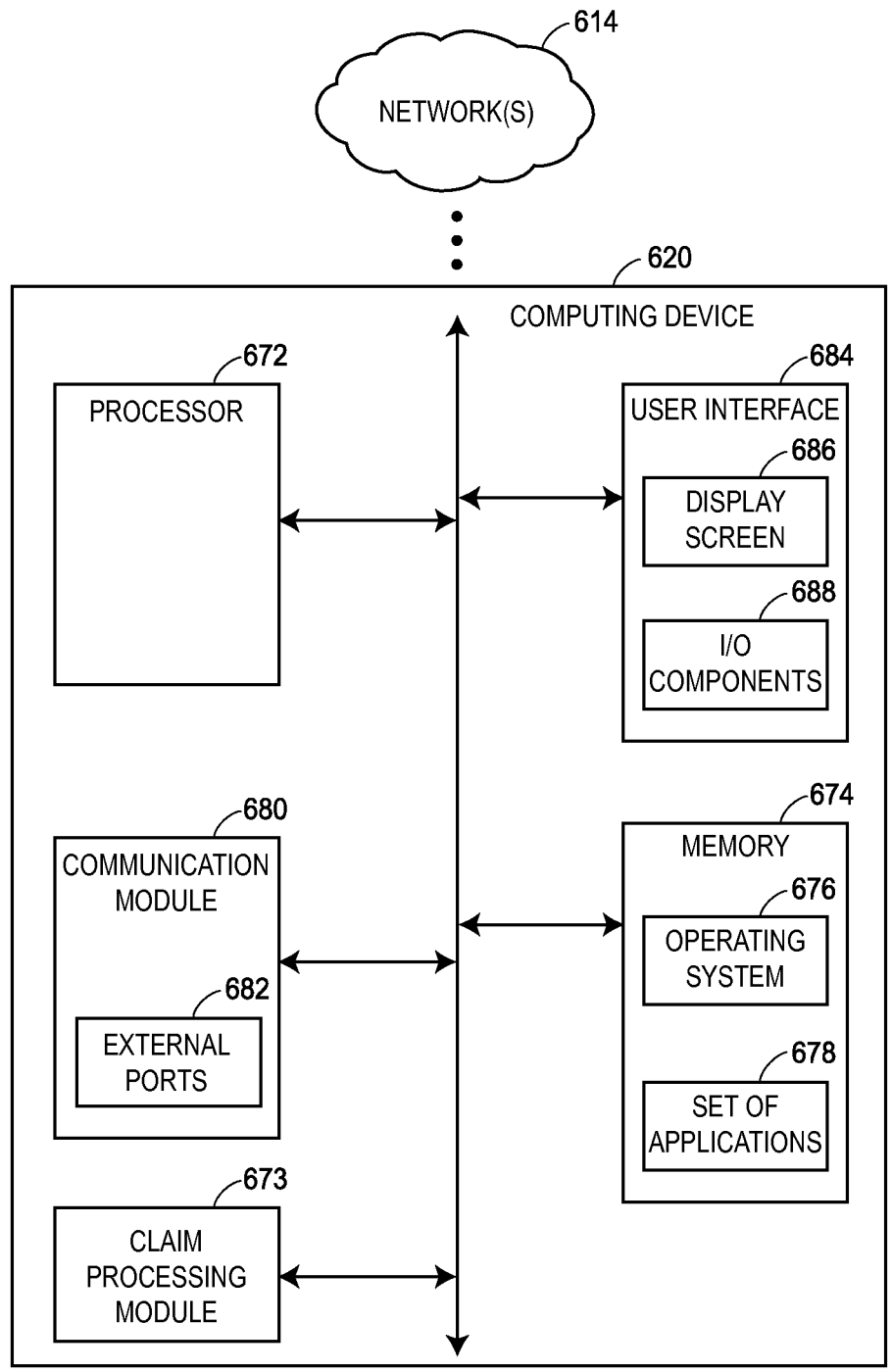
FIG. 6 is a block diagram of a computing device in accordance with some embodiments.

FIG. 6 illustrates an example computing device 620 (such as at least a portion of the processing server 120 as discussed with respect to FIG. 1) in which the functionalities as discussed herein may be implemented. It should be appreciated that the computing device 620 can be a part of the processing server 120 or as part of any of the components (e.g., 350, 352, 354, 356, 360, 362, 364, 366) of the processing server 120, as discussed herein. The computing device 620 can include a processor 672 as well as a memory 674. The memory 674 can store an operating system 676 capable of facilitating the functionalities as discussed herein as well as a set of applications 678 (i.e., machine readable instructions). For example, one of the set of applications 678 can facilitate the insurance claim accuracy detection techniques, as well as perform other functionalities as discussed herein. The processor 672 can interface with the memory 674 to execute the operating system 676 and the set of applications 678. According to embodiments, the memory 674 can also store data associated with insurance policies, such as any specified coverages or other parameters, customer data, loss event data, and/or any other data as discussed herein. The memory 674 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The computing device 620 can further include a communication module 680 configured to communicate data via one or more networks 614. According to some embodiments, the communication module 680 can include one or more transceivers (e.g., WW AN, WLAN, and/or WPAN transceivers) functioning in accordance with IEEE standards, 3GPP standards, or other standards, and configured to receive and transmit data via one or more external ports 682. For example, the communication module 680 can receive loss event data from various sources via the network 614. In one embodiment, the computing device 620 may include a claim processing module 673 configured to receive insurance claim submissions and/or perform any related processing. The computing device 620 may further include a user interface 684 configured to present information to a user and/or receive inputs from the user. As shown in FIG. 6, the user interface 684 includes a display screen 686 and I/O components 688 (e.g., ports, capacitive or resistive touch sensitive input panels, keys, buttons, lights, LEDs, speakers, microphones). According to embodiments, the user may access the computing device 620 via the user interface 684 to process insurance policies and/or perform other functions. In some embodiments, the computing device 620 can perform the functionalities as discussed herein as part of a "cloud" network or can otherwise communicate with other hardware or software components within the cloud to send, retrieve, or otherwise analyze data.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 672 (e.g., working in connection with the operating system 676) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled,"

however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of detecting inaccurate insurance claims associated with a loss event, the method comprising:
   continuously receiving, via a network connection using dedicated stream processing hardware, loss event data related to the loss event, the loss event data indicating a property;
   continuously receiving, via the network connection using the dedicated stream processing hardware, social networking data from a social networking service, the social networking data including a set of posts submitted by a set of users, the set of posts including (i) a first post including at least one image and a caption for the at least one image, and (ii) a second post including textual content;
   continuously receiving, from a set of news sources via the network connection using the dedicated stream processing hardware, news data associated with the loss event;
   routing the loss event data, the social networking data, and the news data to a high-speed memory store;
   indexing, using at least one inverted index, the loss event data, the social networking data, and the news data;
   semantically analyzing, in real-time as the social networking data and the news data are continuously received, routed to the high-speed memory store, and indexed using the at least one inverted index, the social networking data and the news data to identify a set of relevant data, including:
      identifying the loss event depicted in the at least one image,
      determining that the caption for the at least one image indicates the loss event,
      determining that textual content of the second post is not relevant to the loss event,
      including the first post in the set of relevant data, and
      excluding the second post from the set of relevant data;
   receiving an insurance claim from a claimant customer, the insurance claim associated with an insurance policy for the property and the insurance claim indicating a claimed monetary amount of damage to the property; and
   automatically, with one or more processors:
      examining the loss event data and the set of relevant data to estimate an actual monetary amount of damage to the property,
      calculating a difference between the claimed monetary amount of damage and the actual monetary amount of damage, and
      comparing the calculated difference to a threshold amount or percentage.

2. The computer-implemented method of claim 1, wherein continuously receiving the loss event data related to the loss event comprises continuously receiving sensor data from at least one sensor device associated with the property, and wherein examining the loss event data comprises examining the sensor data to estimate the actual monetary amount of damage.

3. The computer-implemented method of claim 1, wherein continuously receiving the loss event data related to the loss event comprises continuously receiving third-party data from at least one third-party server, and wherein examining the loss event data comprises examining the third-party data to (1) identify the property and (2) estimate the actual monetary amount of damage to the property.

4. A system for detecting inaccurate insurance claims associated with a loss event, comprising:
   stream processing hardware;
   a communication module adapted to continuously receive, via a network connection using the stream processing hardware, (i) loss event data related to the loss event, the loss event data indicating a property, (ii) news data associated with the loss event, and (iii) social networking data from a social networking service, the social networking data including a set of posts submitted by a set of users, the set of posts including (i) a first post including at least one image and a caption for the at least one image, and (ii) a second post including textual content;
   a claim processing module adapted to receive an insurance claim from a claimant customer, the insurance claim associated with an insurance policy for the property;
   a high-speed memory store;
   a memory adapted to store non-transitory computer executable instructions; and
   a processor interfaced with the communication module, the claim processing module, the high-speed memory store, and the memory, wherein the processor is configured to execute the non-transitory computer executable instructions to cause the processor to:
      route the loss event data, the social networking data, and the news data to the high-speed memory store,
      index, using at least one inverted index, the loss event data, the social networking data, and the news data,
      semantically analyze, in real-time as the news data and the social networking data are continuously received, routed to the high-speed memory store, and indexed using the at least one inverted index, the news data and the social networking data to identify a set of relevant data, including:
         identify the loss event depicted in the at least one image, determine that the caption for the at least one image indicates the loss event,
determine that textual content of the second post is not relevant to the loss event,
include the first post in the set of relevant data, and exclude the second post from the set of relevant data,
examine the insurance claim to identify a claimed monetary amount of damage to the property,
identify at least a portion of the loss event data that indicates the property, and
automatically:
   examine at least the portion of the loss event data and the set of relevant data to estimate an actual monetary amount of damage to the property,
   calculate a difference between the claimed monetary amount of damage and the actual monetary amount of damage, and
   compare the calculated difference to a threshold amount or percentage.

5. The system of claim 4, wherein the communication module automatically receives the loss event data related to the loss event from at least one sensor device associated with the property, and wherein the processor is further configured to execute the non-transitory computer executable instructions to cause the processor to examine the loss event data from the at least one sensor device to estimate the actual monetary amount of damage.

6. The system of claim 4, wherein the communication module automatically receives the loss event data related to the loss event from at least one third-party server and wherein the processor is further configured to execute the non-transitory computer executable instructions to cause the processor to examine the loss event data from the at least one third-party server to estimate the actual monetary amount of damage to the property.

* * * * *